2,730,454

Patented Jan. 10, 1956

2,730,454

ASPHALT COMPOSITIONS AND METHOD OF PREPARING SAME

Harry J. Sommer, Lafayette, and Walter H. Peterson, Point Richmond, Calif., assignors to Shell Development Company, Emeryville, Calif., a corporation of Delaware No Drawing. Application May 12, 1953, Serial No. 354,654

8 Claims. (Cl. 106—273)

This invention relates to asphalt compositions. More particularly, it is concerned with asphalt compositions having improved high temperature properties.

Asphalts are utilized for numerous purposes such as roofing, coating, sealing and paving. In most processes for such utilization the asphalt is heated previous to (or during) its application or is applied in the form of an emulsion. When asphalts are applied as such or in the form of a cut-back or a similar composition the temperature of application is relatively critical and is directly related to the mechanism being employed, such as road laying equipment or roofing apparatus. Many asphalts when heated to the usual temperatures of application exhibit lower viscosity than is desired and result in excessive penetration or loss of the material into a ground formation (such as during road preparation), or excessive saturation of a roofing felt. In other words, the asphalt exhibiting such undesirable properties shows too great a response to thermal change.

It is an object of the present invention to provide bituminous compositions having improved thermal stability. It is a particular object of this invention to provide bituminous compositions exhibiting lower temperature-susceptibility to an increase in temperature. It is a further object of the present invention to provide a process for the preparation of such compositions. An additional object of the invention comprises the stabilization with respect to hardening of bituminous compositions. Other objects will become apparent and the foregoing ones will be more fully understood from the following description of the invention.

Now, in accordance with the present invention, it has been found that bituminous compositions modified by the presence of a minor amount of a colloidally dispersed clay bearing hydrophobic cationic surface active radicals on the surface thereof, exhibits a lower response to thermal change. More particularly the modification of asphalt with an amount between about 0.1% and about 5% each of a colloidally dispersed clay and, on the surface thereof, hydrophobic cationic surface active radicals, results in a composition having a viscosity at ambient temperature which is substantially unaltered from that of the unmodified asphalt, but which at relatively elevated temperatures of application exhibits a higher viscosity than that of the unmodified asphalt. One phase of the present invention comprises a preferred means for the incorporation of the subject additive in asphalt which avoids excessive milling or working which may be otherwise required. Briefly, this improved process comprises dispersing a clay in an aqueous medium, modifying the clay with the hydrophobic cationic surface active radicals, adding an oleaginous water-insoluble liquid thereto, whereby the modified clay and liquid separate from a majority of the aqueous fluid; incorporating the separated oleaginous liquid and modified clay in asphalt at a temperature sufficient to fluidize the asphalt and to evaporate at least any remaining water therefrom. One version of the process comprises the use of a relatively volatile oleaginous fluid which is evaporated from the asphalt composition together with any water which may be present, all as more particularly explained hereinafter.

The chief advantage gained by the use of the present invention specifically comprises the formation of bituminous compositions which are less fluid at elevated temperatures than corresponding unmodified asphalts. Furthermore this advantage is gained without any adverse alteration of the properties of the asphalt at lower temperatures. In addition the unexpected stabilizing effect is highly desirable, particularly in such compositions as pavings which ordinarily tend to harden and crack upon aging.

The modified clays suitable for use in the present composition comprise two principal classes of materials. Both classes may be generally described as possessing particles having oleophilic surfaces. Consequently one of the main classes of suitable clays comprises those which have been modified by exchanging the exchangeable inorganic cation thereof for an oleophilic onium base of a type capable of, and to an extent sufficient to form an onium clay swelling at least 8-fold in nitrobenzene. The second main class of suitable additives comprises clays which have not necessarily been chemically modified (as occurs in the first class) but which bear adsorbed on the surface thereof a hydrophobic (oleophilic) cationic surface active agent in an amount and of such character as to produce a product having like swelling characteristics.

The clays which are useful as starting materials for the preparation of the subject additives, in accordance with this invention, are those exhibiting substantial base exchange properties and particularly those exhibiting comparatively high base exchange properties which contain cations capable of more or less easy replacement. The clays particularly contemplated by the specification and claims include the montmorillonites, sodium, potassium, lithium and other bentonites, particularly of the Wyoming type; magnesium bentonite (sometimes called hectorite) and saponite; also nontronite and attapulgite, particularly that of the Georgia-Florida type. These clays, characterized by an unbalanced crystal lattice, are believed to have negative charges which are normally neutralized by inorganic cations. As found in nature, therefore, they exist as salts of the weak clay-acid with bases such as the alkali- or alkaline-earth metal hydroxides. Bentonites which are particularly useful are the swelling bentonites of the Wyoming type and the swelling magnesium bentonites of the hectorite type.

The base-exchange capacities of the various clays enumerated run from about 25 to about 100, based upon milliequivalents of exchangeable base per 100 grams of clay. The montmorillonites have comparatively high base-exchange capacities, viz., 60–100. Attapulgite has substantial base-exchange capacity, viz., 25–35. Generally the clays of higher base-exchange capacities are particularly useful where high exchange of an organic base for the cation of the clay is desired.

More specifically, and in accordance with illustrative embodiments of this invention, a clay of the character described and exhibiting substantial base-exchange capacity, is reacted with an organic compound, more particularly one hereinafter generally defined and referred to as an "onium" compound, by the substitution for the cation of the organic compound, which cation is of a class hereinafter referred to as an "onium" base. This invention is not, however, restricted to the use of a reaction product of a base-salt with clay-salt, but includes the reaction product of a free base with an acid-clay.

An "onium" compound has been defined in Hackh's Chemical Dictionary, second edition, as "A group of organic compounds of the type $RXH_y$ which are isologs of ammonium and contain the element X in its highest positive valency, viz.;

"Where X is pentavalent as in ammonium, phosphonium, arsonium, and stibonium; where X is trivalent, as in iodonium compounds; and that they may be considered addition compounds of oxonium, carbonium, stibonium."

A number of the compounds capable of reacting with clays, particularly bentonite, will be described. It is to be understood, however, that various other compounds reactable with clays of the character described, may be employed. These compounds include salts of aliphatic amines, primary, secondary, and tertiary amines, including mono- and poly-amines, also quaternary ammonium compounds, as well as other monobasic or polybasic onium halides, e. g. dialkyl-sulphonium and selenonium halides. The untreated sodium bentonite in contact with water adsorbs large quantities of the water and swells, forming a gel. This swelling has been attributed to the lamellar structure of the clay mineral and to adsorption of water molecules onto the surfaces of the mineral sheets, thus giving rise to a separation of the sheets as the oriented water layers build up to an appreciable depth. If the surfaces of the clay laminae contain hydrophobic organic matter, as by base-exchange reaction with an organic base having a hydrophobic cation, the ability of water molecules to be adsorbed is reduced substantially and in many cases essentially eliminated, and the clay no longer exhibits its former swelling capacity in water. Thus, Wyoming bentonite, for example, which is essentially the sodium salt of montmorillonitic acid, is capable of reacting with organic bases or their salts, e. g., 1. $Na^+bentonite^- + C_{12}H_{25}NH_2H^+OH^- \rightarrow$
$C_{12}H_{25}NH_3^+bentonite^- + Na^+OH^-$ or more readily 2. $Na^+bentonite^- + C_{12}H_{25}NH_3^+Cl^- \rightarrow$
$C_{12}H_{25}NH_3^+bentonite^- + Na^+Cl^-$ The resulting dodecylammonium bentonite (montmorillonitate) is visualized as consisting of clay mineral laminae with dodecylammonium groups (ions) fairly regularly distributed over the surfaces, with the hydrocarbon tails extending out over the crystal surfaces. Such a material is now organophilic rather than hydrophilic and as such exhibits in organic liquids some of the characteristics which the untreated clay exhibit in water. For example, it will swell in many organic liquids and will form stable gels and colloidal dispersions therein. Such gels are visually homogeneous and often transparent or translucent. They are thermally stable up to the boiling point of the liquid phase and show little tendency to flow or run when heated. The more dilute systems which are more or less liquid have viscosities much higher than those of the liquids themselves, and in most cases exhibit thixotropic characteristics of the analogous bentonite-water system.

The situation is analogous to the above if the element X of the onium compounds is other than nitrogen. The onium compound should, however, be such that the resultant onium-bentonite will have substantial swelling properties in organic liquids. Such swelling characteristic may be determined by introducing 2 grams of the onium-bentonite product into nitrobenzene and noting the amount of swelling in milliliters. Thus in the case of amine-bentonite products, the employment of salts of aliphatic amines, including the propyl, butyl and octylamines containing from 2 to 8 carbon atoms or of pyridine, cycloaliphatic amines or aromatic amines will produce an amine-bentonite product showing a swelling of from 5 to 7 ml. in nitrobenzene. There is, however, generally a distinct region of increase of swelling with amine-bentonites in which the amine is aliphatic and has in excess of 10 carbon atoms. Thus, the swelling in nitrobenzene of corresponding amine-bentonites are found to be: decylamine-bentonite (10 carbon atoms), 36 ml.; dodecylamine-bentonite (12 carbon atoms), 50 ml.; this high swelling will hold through the series, viz., octadecyl amine-bentonite (18 carbon atoms), 50 ml., and like bentonites. Such products may, therefore, well be called "high-swelling" onium-bentonites.

The ratio of the onium compounds, such as, for example, an amine compound, to bentonite, may be varied within certain limits in converting the bentonite to the organophilic conditions. In general, it is satisfactory to react the amine salt with the bentonite in the ratio of 100 milliequivalents of amine salt to 100 grams of bentonite, which is approximately the base-exchange capacity of the standard highly swelling sodium bentonites. In accordance with this invention, it is not necessary that the inorganic cation of the clay be completely replaced by the onium base; some of the objects and useful results of this invention may be obtained by partial replacement.

For the most efficient use of organic base to obtain optimum gelling properties, it is therefore desirable either to select an onium compound such as an amine compound, which when converted to the onium base form and reacted by base-exchange with the clay, is attached to certain points on the surface of the mineral, or to substitute the proper aliphatic chain in a polyammonium base. It has been found that a base with a molecular area of about 70 square Angstrom units or a linear dimension of at least 14 Angstrom units, for example, a primary amine with a chain of 10 carbon atoms, e. g., decyl amine will substantially fulfill the requirements of covering the clay surface. Other types of amines, however, may be used also, e. g., polyamines such as triethylenetetramine, secondary amines such as di-dodecylamine, tertiary amines such as lauryldimethylamine and quaternary ammonium compounds such as dimethyldicetylammonium hydroxide. An excess of organic matter as occasioned by use of an amine of area greater than 70 square Angstroms or a linear dimension of at least 14 Angstrom units, as, for example, octadecyl amine, is not detrimental to the viscosity increasing properties of the amine-bentonite composition. Good results, for instance, have been obtained with primary amines having hydrocarbon chains of twenty or more carbon atoms.

The above "onium clays" may be mixed with clays bearing absorbed materials or may be utilized as the sole type of modifying agent. When used as the only modifying agent it is preferred that the onium clay be present in amounts of between about 0.2% and about 10% by weight of the asphalt.

In place of, or in combination with the above described onium clays, suitable additives may be prepared which comprise the same class of high base exchange clays, the colloidal particles of which have been modified by adsorption therein (rather than reaction) of hydrophobic cationic surface active agents, preferably using from about 0.1–5% by weight each, based on the asphalt.

The cationic surface active agents especially preferred for use in the present compositions comprise those which are substantially water insoluble or highly hydrophobic. This class, therefore, includes principally amines which term is understood to include hydrophobic amido-amines as well as hydrophobic amines. Several of the preferred classes of such substances are as follows: Primary, secondary, tertiary alkyl amines and other aliphatic amines, including dodecylamine, hexadecylamine, octadecylamine and mixtures thereof. These are normally regarded as the "fatty amines." Preferably, the amines should contain at least 10 carbon atoms and, still more preferably, at least 10 carbon atoms in a single aliphatic hydrocarbon chain.

Another class of suitable hydrophobic surface active agents may be generically described as hydroxyalkyl polyalkylene amines. These are preferably in the form of amido-amines in which at least 30% of the amino nitrogen atoms are in the amido form with relatively high molecular weight organic acids. Other materials include polyalkyl amines, aliphatic hydroxy amines and amido alkyl amines. Suitable polyalkylene polyamines include such substances as triethylene tetramine and tetraethylene pentamine.

As compared with the other types of onium compounds and cation materials described hereinbefore the most highly preferred class of hydrophobic agent comprises a higher organic carboxylic acid amide of condensation products of halohydrins and derivatives thereof, such as epichlorhydrin, and simple basic $HNR_2$ compounds wherein R is a hydrogen atom or a lower alkyl group, such as ammonia and low molecular weight primary and secondary amines. This class of compounds, their preparation and their use as asphalt adhesion agents are described in the co-pending U. S. patent application, Serial No. 150,824, filed March 20, 1950, by Vanan C. Irvine and Harry J. Sommer. The improving agents to be used in the subject compositions are oleophilic organic amino oxy compounds, preferably containing a plurality of (at least 3) amino nitrogen atoms and hydroxy or alkoxy groups taken together. In a preferred class of the agents, two of one and one of the other of amino and hydroxy groups are attached to different but closely associated carbon atoms so that no two of them are separated by more than 10 other atoms. By the terms "amino nitrogen atom," "amino group," and other terms of similar import, is meant a nitrogen atom directly attached to a carbon atom, regardless of whether the nitrogen atom is also attached to hydrogen atoms, other carbon atoms and/or to some other atom or atoms, and regardless of what other atom or atoms may be attached to the nitrogen-bonded carbon atom. Thus the terms are meant to include alkyl amino compounds and also acyl amino compounds (amides), as well as alkyl acyl amino compounds. By the term "oxy" is meant hydroxy and alkoxy. Thus, the agents are at least partially oleophilic polyamino alcohols or polyhydroxy amines and corresponding ethers, including, and preferably for the practice of the invention, polymers of the simple, low molecular weight, materials polyamino-alcohols and polyhydroxy amines which come within the foregoing definition, and N-reaction products of the monomers or polymers thereof and mixtures thereof. A particularly preferred class of said agents is the class of organic acid reaction products of said low molecular weight substances and their polymers, particularly the amides which may thus be formed from the low molecular weight monomeric diamino (primary or secondary) alkanols or dihydroxy alkylamines (primary or secondary), by amidation (preferably only partially) of the amino groups thereof by reaction with a fatty acid containing from about 12 carbon atoms to about 24 carbon atoms, and corresponding amides of polymers (particularly dimers and trimers and mixtures thereof) of said low molecular weight monomeric substances.

The preparation of the improving agents of this invention is exemplified by the condensation of ammonia or primary or secondary amines with a suitable polyfunctional halohydrin, such as monohalodihydroxy-compounds, including their epoxy derivatives, such as epihalohydrins, and dihalo-monohydroxy-compounds. The simplest polyamino hydroxy reaction products thus obtainable, and preferably polymeric products thereof, are reacted with highly oleophilic organic compounds reactive therewith, particularly with the amino groups, such as various organic acylating compounds, and particularly the fatty acids. The amino (NH) reactant which is condensed with the halohydrin preferably is ammonia or an amine which contains a hydrocarbon (preferably aliphatic) radical(s) or other organic substituent radical having not more than 20 carbon atoms per radical, preferably 10. These include the primary aliphatic amines such as methylamine, ethylamine, up to dodecylamine, the secondary aliphatic amines such as dimethylamine, methyl ethylamine, dipropylamine, dihexylamine, and the like, the polyamines such as ethylene diamine, propylene diamine, tetraethylene pentamine, and the like, as well as the amines which contain various substituent polar groups. In general, the amino reactant should have a molecular weight which is not greater than about 250, while it is preferred to use those which have molecular weights no greater than about 150, including any substituent groups therein.

While the condensation products formed from epichlorhydrin, in accordance with the invention, are preferred, the general class of monohaloepoxyalkanes has been found to be particularly suitable for use in the invention, and especially when the amine condensation products thereof are acylated with fatty acids having at least 12 carbon atoms per molecule. Preferably the haloepoxyalkanes should have no more than 10 carbon atoms in the molecule, and typically suitable representative species of these include:

Epichlorohydrin (1,2-epoxy-3-chloropropane)
2,3-epoxy-4-chlorobutane
1,2-epoxy-3-isopropyl-3-iodopropane
1,2-epoxy-4-chlorobutane
1,2-epoxy-5-chloropentane
1,2-epoxy-3-methyl-3-chloropropane
1,2-epoxy-3,3-dimethyl-3-chloropropane
1,2-epoxy-2-methyl-3-bromopropane
2,3-epoxy-4-methyl-1-chlorohexane
1,2-epoxy-4-methyl-5-bromopentane Another class of halohydrins which is particularly suitable for the preparation of the agents of this invention comprises the monohalo-dihydroxyalkanes, representative suitable species of which are:

2-chloro-1,3-dihydroxypropane
1-chloro-2,4-dihydroxybutane
1-chloro-2,3-dihydroxybutane
3-chloro-1,6-dihydroxyhexane
1-chloro-2,4-dihydroxy-3-methylbutane
2-chloro-1,6-dihydroxy-3,4-dimethylhexane
1-iodo-2,3-dihydroxypropane
1-bromo-2,3-dihydroxypropane
2-bromo-1,3-dihydroxypropane It is generally preferred to prepare the condensation products from these monohalodihydroxy compounds in the presence of a dehydrating catalyst such as a strong alkali hydroxide.

Amine-halohydrin condensation products of higher molecular weight may be obtained by condensation of the amino compound (preferably ammonia) with dihalohydrins, a preferred compound being 1,3-dichloro-2-hydroxypropane. Suitable specific dihalohydrins include:

1,2-dichloro-3-hydroxypropane
1,6-dichloro-2,5-dihydroxyhexane
1,3-dibromo-2-hydroxypropane
1,3-diiodo-2,5-dihydroxypentane
1,4-dichloro-3-methyl-4-hydroxybutane
1,3-dichloro-3,6-diethyl-5-hydroxyhexane Also, the dihalohydrins are particularly useful compounds for the preparation of resinous materials to be used for the purpose of the invention, by the reaction of said dihalohydrins with alkalene polyamines, preferably tetraethylenepentamine. Other representative suitable compounds are:

1,3-diaminopropane
1,4-diamino-n-butane
1,3-diamino-n-butane
1,5-diamino-n-pentane
1,6-diamino-n-hexane
1,10-diamino-n-decane
1,6-diamino-3-methyl-n-hexane
3,3'-diamino dipropyl ether The amine-halohydrin condensation products of the invention are generally formed by interaction of the amine with the halohydrin under suitable reacting conditions, which may be below normal ambient room temperature or at an elevated temperature, depending on the reactivities of the particular substances involved. The initial condensation product may be caused to condense further or to polymerize, generally by maintaining it at the initial reaction condition for an extended period of time and/or by heating the material to a still higher temperature. The condensation product may then be converted to more oleophilic materials, if desired, by causing it to react with an oleophilic compound which is reactive therewith, such as an organic acid containing an oleophilic radical.

As noted hereinbefore, the co-pending application to Irvine and Sommer discloses the use of the subject hydroxy amino surface active agents in asphalt compositions for the purpose of improving the adhesion characteristics thereof. In this respect it should be pointed out that their utilization in the present compositions is for a completely different purpose and, in fact, their adhesion promoting properties are not available. This applies to the entire class of cationic substances described herein, apparently due to the strong adsorption of the surface active material upon the surfaces of the colloidally dispersed clay. In such a system it appears that the surface active agent is preferably held by the clay and does not migrate to any substantial extent to the interfacial boundary between the asphalt and any mineral aggregate (such as stone) which may be present. Under these circumstances, therefore, the present compositions, as distinguished from those of Irvine and Sommer, exhibit no increased adhesion characteristics. On the other hand, it may be stated parenthetically that the compositions of Irvine and Sommer which have improved adhesion characteristics, but contain no clays, do not possess the improved high temperature properties obtained by applicant's compositions.

Various methods may be employed for the incorporation of the oleophilic collodial clay in asphalt. In general these will comprise the formation of the oleophilic clay either by the reaction or adsorption techniques prior to incorporation in the asphalt. Subsequent to such formation the oleophilic clay may be incorporated in the asphalt together with sufficient working to uniformly distribute the additive therethroughout.

In accordance with a preferred version of the present invention a means has been discovered for the incorporation of the oleophilic clay in the asphalt with substantially no shearing action required. This process comprises the dispersion of the subject clay in water to form a dilute suspension. The water may be unmodified or may contain organic water miscible diluents such as acetone and alcohols. For convenience of handling, it is preferred that the aqueous suspension contain from about 0.25% to about 5% by weight of the clay based on the weight of the water, and usually between about 0.5% and 2.5%. Following the formation of a highly swollen hydrosol of the clay, the hydrophobic cationic surface active agent may be added thereto, either in the form of an onium salt for the preparation of onium clays or in the form of the above described cationic surface active agents for the purpose of adsorption upon the colloidal particles of the clay. Subsequent to, or coincident with the addition of the hydrophobing agent, a water immiscible oleaginous liquid is added to the mixture. This is preferably employed in percentage amount, based on the amount of clay, which is from 1–5 times the surface area of the clay in square meters per gram. Under these preferred conditions it has been found that globules containing only part of the water and substantially all of the clay now modified with the hydrophobing radicals separate from the main body of the water. Consequently the latter portion of water may be removed by any convenient means, such as decanting, to leave the partially hydrous but waterproofed clay now dispersed in the oleaginous liquid. In completing this process these globules are now transferred to the asphalt which is heated sufficiently to fluidize the latter and to evaporate any remaining water. In the event the oleaginous liquid is not intended as a permanent component of the bituminous composition the temperature should be sufficient to cause its removal by evaporation together with any water which may be present. However the organic liquid may, in fact, constitute one of the ingredients forming a permanent part of the bituminous composition. In such a case it will probably comprise a cutter-stock such as those which are well-known in the asphalt art. These may be aliphatic or aromatic hydrocarbons, usually derived from petroleum or coal-tar sources. The preparation and boiling range of the cutter-stock will depend upon the specific purpose for which the composition is to be employed. A preferred type of cutter-stock, particularly with West-Coast asphalts, comprises the aromatic extracts obtained from distillates of lubricating oil viscosity.

If the oleaginous liquid is to be utilized only during the preparation of the bituminous composition, it may comprise a relatively volatile material such as kerosene or even lighter hydrocarbons, such as heptane and the like. Alternatively polar compounds such as octyl alcohol or relatively volatile esters as well as ketones may be employed. In such cases means for removal of the volatilized oleaginous liquid should be provided.

As indicated hereinbefore, the advantage of the present invention comprises the relatively higher viscosity of the bituminous compositions modified with the oleophilic colloidal clay as compared with similar compositions which are not so modified, said higher viscosity being in evidence only at relatively elevated temperatures. When employed in the amounts proposed hereinbefore, the subject additives do not appreciably effect the viscosity of the compositions at normal ambient temperatures but only are effective when the temperature of the composition is above about 100° C.

Although the viscosity effect is only noted appreciably above this temperature, a secondary beneficial effect is inherently imparted to the composition and is present at all times regardless of the temperature. This unexpected secondary effect comprises the suppression of age-hardening of the bituminous product by oleophilic clay. This can be best determined and readily demonstrated by viscosity measurements on thin films as brought out in the following examples, these examples being intended to demonstrate the advantages of the invention but not to constitute any limitations thereon.

The term "bituminous composition" is meant to include those materials containing asphaltenes and tarry constituents and maltenes. These include natural asphalts such as Trinidal asphalts, asphaltites, such as gilsonite, pyrogenous residues such as the residues from petroleum fractionation, blown bituminous asphalts and similar products.

Example I

An asphalt was prepared by mixing straight-run hard asphalt with sufficient aromatic extract of lubricating oil to give a paving asphalt having a penetration at 77° F. of about 100. This was modified by the addition of colloidally dispersed hectorite which had been surface modified by adsorption thereon of 80% by weight, based on the clay, of a hydrophobic additive. This additive was prepared by reaction of an excess of ammonia with epichlorhydrin and subsequent reaction of the condensation product so formed with ⅓ of an equivalent weight of mixed vegetable oil fatty acids.

The modified colloidally dispersed hectorite was prepared as follows: Hectorite was dispersed in water to form a hydrosol of about 1% concentration. The hydrosol was heated to about 80° and the hydrophobic additive incorporated therein with stirring to produce a hydrogel of the water-proofed clay which separated from a substantial portion of the water. The latter was decanted. To this was added an amount of the aromatic lubricating oil extract in a proportion of about 3½ parts by weight for each part of hectorite. The soft gel containing a minor proportion of water was added to asphalt, heated to a fluid state, and maintained at a temperature above the boiling point of water until the composition was substantially anhydrous. Three modified asphalt compositions containing varying amounts of the hectorite and additive were so prepared. The viscosities of the unmodified asphalt and of the three samples modified with the additives were determined at 150° C. The table which follows presents the data so obtained. It will be noted that the viscosity at 150° C. was substantially increased over that of the unmodified asphalt in substantially direct proportion to the amount of water-proofed hectorite present.

| Example | A | B | C | D |
|---|---|---|---|---|
| Percent Hectorite | 0 | 0.22 | 0.58 | 0.74 |
| Percent Hydrophobic Additive | 0 | 0.18 | 0.47 | 0.59 |
| S. F. Visc. at 150° C., sec | 41 | 50 | 85 | 97 |

*Example II*

The procedure described in the above example was repeated using a cracked asphalt instead of a straight-run material. The amounts of the additives are given in the table below, together with the viscosity of the original asphalt and of the composition modified in accordance with the present invention. It will be seen that the modified composition had a viscosity at 150° C. which was about 2½ times greater than that of the original material. The same clay and hydrophobic additive described in Example I were employed.

| Example | E | F |
|---|---|---|
| Percent Hectorite | 0 | 0.69 |
| Percent Hydrophobic Additive | 0 | 0.56 |
| S. F. Visc. at 150° C., sec | 56 | 137 |

*Example III*

Wyoming bentonite is dispersed in water to form a hydrosol of about 1.5% concentration. To this is added about 75% by weight of dimethyl dioctadecyl ammonium bromide to form an onium clay. The further addition of heptane in an amount of about 2.5 parts by weight for each part of bentonite causes separation of the onium clay and heptane from a substantial amount of the water. This mixture, when added to straight-run asphalt in an amount of about 1% by weight, forms a composition having a viscosity approximately three times that of the unmodified asphalt at 150° C.

*Example IV*

In demonstrating the effect of the subject additives for the prevention of age hardening, a composition was prepared containing 0.7% hectorite, whose surface had been water-proofed by the presence of about 75% by weight of the same hydrophobic additive described in Example I. Films about 5 microns thick were spread on glass and aged in air for 20 hours at 140° F. The unmodified asphalt was tested under the same conditions. Under these conditions the original asphalt increased in viscosity about 30% while the asphalt modified in accordance with the present invention increased only about 5% in viscosity.

*Example V*

When asphalt is modified with onium clays prepared from lower molecular weight aliphatic amines (e. g. butylamine), or cyclic amines (e. g. alkyl pyridines) substantially no effect upon the asphalt viscosity at elevated temperatures is noted.

We claim as our invention:

1. A bituminous composition comprising an asphalt having colloidally dispersed therein from about 0.2% to about 10% by weight of a clay having a base exchange capacity of at least 25, the colloidal particles of the clay having adsorbed on the surfaces thereof an amide formed between a fatty acid having at least 12 carbon atoms per molecule and a condensation product of a monohaloepoxyalkane having no more than ten carbon atoms per molecule and a nitrogen base of the group consisting of ammonia, monoalkylamines and dialkyl amines.

2. A bituminous composition comprising a major proportion of asphalt, from about 0.1% to about 5% by weight of a colloidally dispersed clay, and from about 0.1% to 5% by weight of a cationic hydrophobic surface active agent of the group consisting of aliphatic amines having at least 10 carbon atoms per molecule and amino amides formed between fatty acids having at least 10 carbon atoms per molecule and hydroxyalkyl polyamines, said agent being substantially completely adsorbed on the surface of said clay.

3. A bituminous composition comprising an asphalt having colloidally dispersed therein from about 0.2% to about 10% by weight of a clay having a base exchange capacity of at least 25, the colloidal particles of clay having adsorbed on the surfaces thereof from about 25% to about 100%, based on the weight of the clay, of a cationic hydrophobic surface active agent of the group consisting of aliphatic amines having at least 10 carbon atoms per molecule and amino amides formed between fatty acids having at least 10 carbon atoms per molecule and hydroxyalkyl polyamines.

4. A bituminous composition comprising a major amount of asphalt, having colloidally dispersed therethrough between about 0.2% and about 10% by weight of an oleophilic clay product consisting of a high base exchange clay having absorbed on the surfaces thereof from about 25% to about 100%, based on the weight of the clay, of a cationic hydrophobic surface active agent of the group consisting of aliphatic amines having at least 10 carbon atoms per molecule and amino amides formed between fatty acids having at least 10 carbon atoms per molecule and hydroxyalkyl polyamines.

5. The method of preparing the composition of claim 4 which comprises forming an aqueous clay dispersion, adding thereto a hydrophobing amount of a hydrophobic cationic surface-active agent of the group consisting of aliphatic amines having at least 10 carbon atoms per molecule and amino amides formed between fatty acids having at least 10 carbon atoms per molecule and hydroxyalkyl polyamines whereby a hydrophobic clay product consisting of clays bearing absorbed surface-active agents, are formed, mixing therewith a relatively volatile water-immiscible oleaginous liquid, whereby the clay product associates with said liquid and water separates therefrom and is removed, combining the remaining ingredients with liquefied asphalt with agitation and heating the mixture so formed, whereby the remaining water and oleaginous liquid are evaporated and the composition according to claim 4 is formed.

6. A bituminous composition comprising a major amount of asphalt and from about 0.1% to about 5% by weight each of a colloidally dispersed clay and a higher saturated fatty acid amino amide of a condensation product of epichlorhydrin and ammonia, said amide being substantially completely adsorbed on the surface of said clay.

7. A composition according to claim 6, wherein the clay is hectorite.

8. A composition according to claim 6, wherein the clay is a bentonite.

References Cited in the file of this patent

UNITED STATES PATENTS 2,314,111   Tucker _____ Mar. 16, 1943
2,622,987   Ratcliffe _____ Dec. 23, 1952